Figure 1:
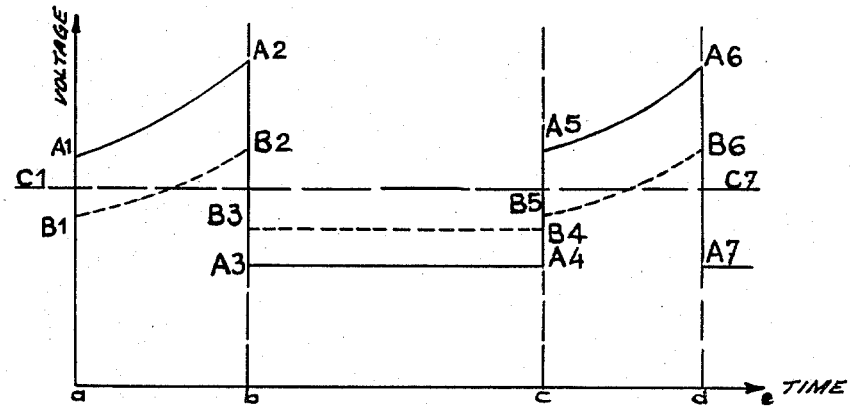

March 23, 1965  R. ROWE  3,175,146
REGULATING SYSTEM FOR BATTERIES
Filed Jan. 28, 1958  3 Sheets-Sheet 1

INVENTOR
ROBERT ROWE
BY
ATTORNEY

March 23, 1965   R. ROWE   3,175,146
REGULATING SYSTEM FOR BATTERIES
Filed Jan. 28, 1958   3 Sheets-Sheet 2

INVENTOR
ROBERT ROWE
BY P. M. Craig Jr.
ATTORNEY.

United States Patent Office 3,175,146
Patented Mar. 23, 1965

3,175,146
REGULATING SYSTEM FOR BATTERIES
Robert Rowe, Paris, France, assignor to Societe de l'Accumulateur Fulmen, Clichy, Seine, France, a French corporation
Filed Jan. 28, 1958, Ser. No. 711,712
Claims priority, application France, Feb. 2, 1957, 730,955; Jan. 9, 1958, 755,525
15 Claims. (Cl. 320—9)

The present invention relates to a regulator for controlling the charging and discharging of a storage battery or accumulator, and more particularly relates to a regulator arrangement for storage batteries or accumulators in which charging and discharging thereof is controlled by the pressure of the gaseous discharge of the battery.

It is known in the prior art to utiilze the gaseous discharge of an electric accumulator or storage battery to stop or limit the charge thereof in such a manner as to reduce this gaseous discharge, to thereupon re-establish the charging when the gaseous discharge has sufficiently diminished, and so forth. A regulator based on this principle of operation enables avoiding overcharging and effectively suppresses in practice those inconveniences and disadvantages which result therefrom, namely deterioration of the battery plates and excessive consumption of water in the battery. Such a regulator is particularly of interest in the case in which the current source is an alternator. In fact, the regulators of the usual type which act on the excitation of field windings of the generator cannot be used to regulate the voltage due to the fact that the inductors of small alternators are formed by permanent magnets so that magnetizing windings are not available which might be adjusted by adjusting the field current therein.

A regulator which operates along the aforementioned principles assures good protection for the battery. Nevertheless, the output voltage of such prior art installation is not regulated as in connection with a voltage regulator of the type generally utilized, for example, in automobiles. This lack of regulation may be a serious inconvenience in that either too high a voltage may damage the apparatus or loads connected with the battery, for example, by burning out filament-type lamps, or in that sudden variations of the voltage at the very moment of operation of the charging regulator may be prejudicial to the utilization thereof, for example, as in the case of a sudden variation of the light intensity or light flux of a headlight of the vehicle.

The present invention has as its primary object to obviate the aforementioned inconveniences and disadvantages encountered in the prior art devices by the utilization of appropriate means for the electrical installation.

It is another object of the present invention to provide a regulator device which is intended to limit the voltage fluctuations in the output or load circuit during charging and discharging of a battery composed of electric cells or accumulators which includes one or several resistances interconnected in the charge or discharge circuits of the accumulator-type battery, and provided with suitable appropriate means to place these resistances into or out of the respective circuits, such means including primarily a regulator having a contact controlled by the pressure of the gases discharged by the battery in the course of charging thereof, the resistances being connected with the regulator and being adapted to be short-circuited by a contact of the regulator.

The regulator may control relays to place into or out of the circuit the resistances interconnected in the charging circuit or in the discharge circuit or to place into or out of the circuit a part of the windings of the supply generator used for purposes of charging the battery.

The relays may be controlled, for example, by the discharge current or currents to cut the regulator out of the circuit.

Accordingly, it is an object of the present invention to provide a pressure-controlled regulator for accumulators or storage batteries which simultaneously protects the battery against excessive charges and controls the output or load voltage of the electrical installation.

It is another object of the present invention to provide a regulator and circuit therefor which is both simple in construction and reliable in operation.

Still another object of the present invention resides in the provision of a regulator circuit arrangement including a pressure-responsive means responsive to the gaseous discharge of the battery which enables effective control of the charge and discharge to and from the battery, respectively.

These and other objects, features and advantages of the present invention will become more obvious from the following description when taken in connection with the accompanying drawing which shows, for purposes of illustration only, several embodiments in accordance with the present invention and wherein:

FIGURE 1 is a schematic diagram indicating the variations of voltages during operation of a regulator in accordance with the present invention; and FIGURES 2 through 7 are circuit diagrams of different embodiments of a control circuit arrangement in accordance with the present invention provided with a regulator which is controlled by the gaseous discharge of the accumulator-type battery.

Referring now to the drawing, wherein like reference numerals are used throughout the various views to designate like parts, FIGURE 1 thereof is a graphic representation of the voltages which occur as a function of time. During the time intervals $a$–$b$ and $c$–$d$ the contact of the regulator including a pressure responsive switch is closed, whereas during the time intervals $b$–$c$ and $d$–$e$, the contact of the regulator is opened. The curve in full lines between $A_1$ and $A_2$ represents the voltage at the terminals $2a$ and $2b$ of the battery under maximum charging conditions, i.e., at which time the generator is fully charging, the discharge is a minimum, the battery is charged and no resistance is interconnected in the charging circuit. At the time $b$, i.e., upon reaching the voltage $A_2$, the charging circuit is opened and charging is thereby discontinued. Consequently, the voltage across the battery terminals would drop almost instantaneously from the value $A_2$ to a lower value. As a result, if the load were connected directly across the battery terminals, the load would not only follow the voltage from $A_1$ to $A_2$ but would also drop to a lower voltage as will be explained more fully hereinafter.

During the period during which the charging circuit is open, the voltage across the battery and therewith in the load remains about the same level, that is, between a period from $b$ to $c$. As soon as the contact of the regulator is closed again at point $c$, the voltage across the terminals of the battery would rise to a value of $A_5$ almost instantaneously and thereupon would continue to climb from $A_5$ to $A_6$ during the period between $c$ and $d$ when charging is resumed, the regulator contact again opening at point $d$ so that the voltage across the battery and therewith in the load would again drop to the lower value.

In other words, when the battery is directly connected to the charging device, such as an alternator, as is the case during the time interval $a$–$b$ and $c$–$d$, the voltage that appears across the terminals rises from a value $A_1$ to a value $A_2$ and from a value $A_5$ to a value $A_6$. On the other hand, during the periods when the charging circuit is effectively disconnected, or when reduced charging of the battery occurs as is the case during the time interval $b$–$c$ and $d$–$e$, the voltage that appears across the battery terminals would be of reduced magnitude, for example, corresponding to a value of $B_3$–$B_4$. According to one feature of the present invention, resistance means are introduced into the charging circuit when the pressure responsive switch of the regulator is actuated to effectively reduce or limit the amount of charging without completely disconnecting the charging circuit.

According to a further feature of the present invention, resistance means are also connected in the discharge or load circuit. These last-mentioned resistance means are intended to regulate the voltage fluctuations at the load.

Assuming that the horizontal line $C_1$–$C_7$ represents the rated voltage of the system when stabilized, the fluctuations in voltage at the load could be reduced during the periods $a$–$b$ and $c$–$d$ by inserting a resistance in the discharge circuit so that the voltage available at the load would be the voltage present at the terminals of the battery, that is the voltage $A_1$–$A_2$ less the voltage drop across the resistance in the discharge circuit whereby the voltage available at the load would follow the curve $B_1$–$B_2$ and $B_5$–$B_6$ during the periods $a$–$b$ and $c$–$d$, respectively.

If upon actuation of the pressure responsive switch at points $b$ or $d$ the voltage at the terminals of the battery would drop to a value shown in FIGURE 1 as $B_3$–$B_4$, then the available voltage at the load would again be reduced by the voltage drop in the discharge circuit so that the load voltage would then follow the curve $A_3$–$A_4$. To improve the overall regulation of the fluctuations of the voltage, during the period of $b$–$c$ the pressure responsive switch, upon actuation thereof at point $b$, short-circuits the resistance in the discharge circuit so that the voltage appearing at the terminals of the battery would also be the voltage appearing at the load.

The foregoing clearly indicates that the proposed arrangement in accordance with the present invention minimizes the voltage fluctuations at the load since the load voltage would follow the curve $B_1$–$B_2$–$B_3$–$B_4$–$B_5$–$B_6$, etc. by the use of the particular arrangement in accordance with the present invention.

When the contact of the regulator is short-circuited, which takes place when the discharge current becomes significant, this produces a voltage curve approximately horizontal corresponding to $C_1$–$C_7$ when the system is stabilized.

The short-circuiting of a part of the windings of the supply generator or alternator with permanent magnets with the aid of a control contact by the regulator enables a reduction in the voltage thereof to impart thereto a curve analogous to $B_1$–$B_2$.

The various means described hereinabove may be combined among each other in any manner suitable to best limit the variations in voltage. They may be used either directly or with the aid of relays.

The resistances, interrupters and relays may be interconnected either in the direct current circuit or in the alternating current circuit. The discharge circuits may be subdivided for the various loads.

An arrangement in accordance with the present invention which is particularly interesting consists, for purposes of placing one or the other of the aforementioned means out of the circuit, of utilizing, on the interrupter or switch actuated by the regulator, a second contact which closes at the moment at which the principal contact opens, thereby closing another circuit. The suitable closure of the second contact is assured either by the thrust itself of the regulator membrane member or by any appropriate means such as a spring or magnet as in connection with the principal contact.

Figure 2:
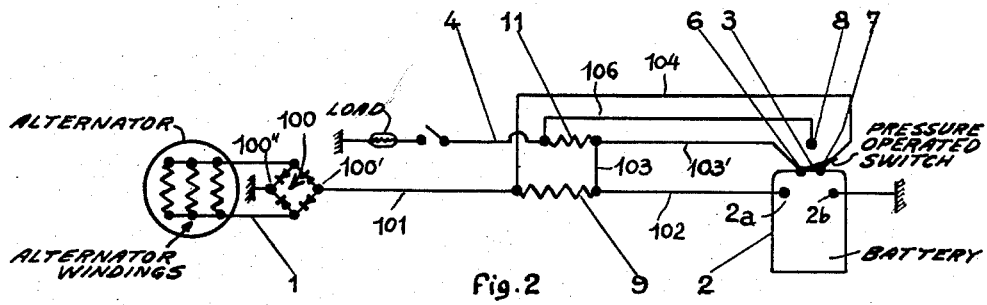

The arrangement illustrated in FIGURE 2 includes a current source 1 comprising a mono-phase alternator having three windings which supplies electrical energy to a rectifier generally designated by reference numeral 100 and of any suitable type. One of the terminals of the rectifier bridge circuit, namely terminal 100' thereof, is connected to the terminal 2a of the accumulator-type battery 2 by the intermediary of a charging circuit 101, 102 including resistance 9 of which the terminals are connected over branch circuits 103, 103' and 104 to the terminals 6 and 7, respectively, of an interrupter or switch 3 of a regulator (not shown) controlled by the pressure of the gaseous discharge of the accumulator battery 2. The second terminal 2b of the battery and the second terminal 100'' of the rectifier are connected to ground. The terminal 2a of the battery 2 is connected to the load circuit 4 over a discharge resistance 11 of which the terminals are connected to terminals 6 and 8 of a regulator by conductors 103' and 106, respectively, and may be short-circuited by the interrupter or contact member 3 of the regulator. The terminal 2a of the battery 2 is thereby connected effectively to the terminal 6 of the regulator by series circuit formed by conductors 102, 103 and 103'.

As long as the gaseous discharge is normal, the contact 3 is urged into engagement with terminal 7, thereby short-circuiting the terminals 6 and 7 and, consequently short-circuiting the charging resistance 9. The charging voltage follows the curve $A_1$–$A_2$ while the load voltage available in the discharge circuit including the voltage regulating resistance 11, follows the curve $B_1$–$B_2$. As soon as the gaseous discharge becomes greater than normal, the contact 3 is pushed into engagement with terminal 8 thereby connecting terminals 6 and 8 with each other and short-circuiting the voltage regulating resistance 11 whereby the load voltage which would normally be the voltage appearing across the battery terminals 2a and 2b and corresponding to the curve $B_3$–$B_4$ less the voltage drop across the resistance 11, i.e., a voltage following the curve $A_3$–$A_4$, effectively becomes the voltage available at the battery terminals by passing from $A_3$–$A_4$ to $B_3$–$B_4$. The voltage available at the load in the discharge circuit follows, therefore, a regulated curve such as $B_1$–$B_2$–$B_3$–$B_4$–$B_5$–$B_6$, as indicated in FIGURE 1, of which the voltage fluctuations are reduced.

Figure 3:
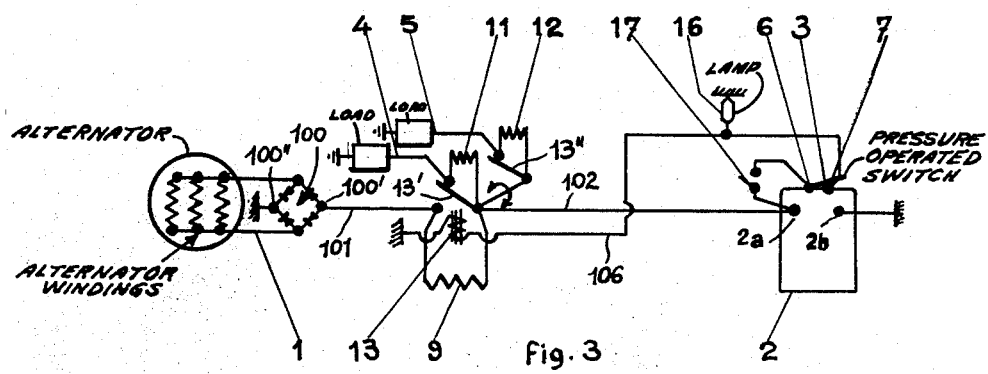

FIGURE 3 represents a modified embodiment in accordance with the present invention which produces the same results as that of FIGURE 2 but which further includes a relay 13 and two discharge or load circuits 4 and 5, respectively. The discharge circuits 4 and 5 are connected, for example, with the headlights and lights of the motor vehicle.

The relay 13 includes a winding connected, on the one hand, over line or conductor 106 with the terminal 7 of the regulator and, on the other, to ground, and two contact members 13' and 13'' connected mechanically with each other in any suitable manner and of which one, namely the contact 13', is adapted to short-circuit the discharge resistance 11 disposed in the first discharge circuit 4 and of which the other, namely contact 13'', is adapted to short-circuit the discharge resistance 12 disposed in the other discharge circuit 5. A pilot lamp 16 is mounted between the conductor 106, i.e., between the terminal 7 of the regulator and ground, and an interrupter or cut-out switch 17 is connected between the terminal 2a of the battery 2 and the terminal 6 of the regulator to make it possible that the winding 13 is not left energized during stoppage. When the contact member 3 of the regulator is closed while the interrupter or switch 17 of any suitable construction, such as a manually operated switch is also closed, the relay 13 short-circuits the charging resistance 9; when the contact 3 is open due to a predetermined gaseous discharge, the winding of the relay 13 is de-energized, and any suitable return means (not shown), for example, a spring or a permanent magnet, urges the contact members 13' and 13'' into the position in which they short-circuit the discharge resistances 11 and 12 of the discharge circuits 4 and 5. The voltage curve at the load in the discharge circuit then becomes analogous to the curve $B_1$–$B_2$–$B_3$–$B_4$–$B_5$–$B_6$, as shown in FIGURE 1.

Figure 4:
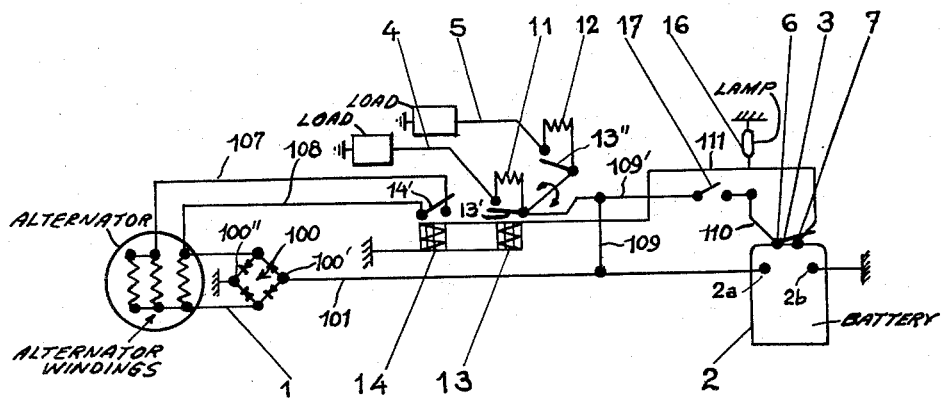

FIGURE 4 represents still another embodiment in accordance with the present invention in which the control relay 13 controls two contact members 13' and 13" which may short-circuit the discharge resistances 11 and 12 in the load circuits 4 and 5, respectively. The resistance 9 of the circuit of FIGURE 3 is replaced in FIGURE 4 by a relay 14 of which the winding is connected in parallel with the winding of relay 13 and which, in turn, controls a contact member 14' of which the terminals are connected over lines or conductors 107 and 108 to the terminals of two windings of the alternator 1. When the contact 3 of the regulator is closed, i.e., when there is insufficient or normal gaseous discharge, both the relay 13 and the relay 14 are energized over lines 101, 109 and 109', switch 17, line 110, terminal 6, contact member 3 and line 111. The relay 14 thereby closes its contact member 14' and places into the circuit all three windings of the alternator-generator 1. When the contact 3 is opened, due to increase in the gaseous discharge of the battery, the energizing circuit for relays 13 and 14 is opened by opening of contact member 3 so that the relay 14 is de-energized and leaves in the circuit only one of the three windings of the alternator 1 while the relay 13, on the other hand, which is now also de-energized again short-circuits with contact members 13' and 13" thereof of the discharge resistances 11 and 12 of the discharge circuits 4 and 5, respectively. The other elements of the arrangement of the embodiment of FIGURE 4 are identical with those of FIGURE 3. The voltage curve is again analogous to $B_1$–$B_2$–$B_3$–$B_4$–$B_5$–$B_6$ of FIGURE 1.

Figure 5:
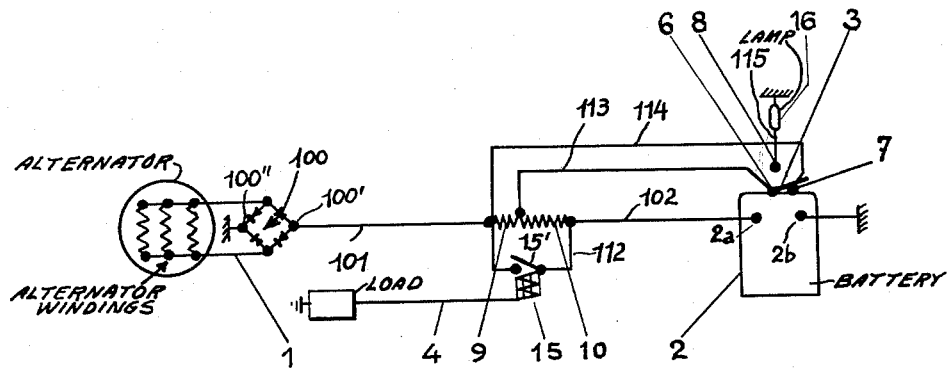

FIGURE 5 indicates a still further modified embodiment in accordance with the present invention which comprises a resistance 9 and a resistance 10 connected in series between the current source 1 and the terminal 2a of the battery over lines or conductors 101 and 102. The contact member 15' of a relay 15 is connected to the terminals of the series circuit consisting of resistances 9 and 10 while the winding of relay 15 is connected in series in the discharge circuit 4 including branch line or conductor 112 in series with line 102. The terminals of the resistance 9 are connected to the terminals 6 and 7 of the contact member 3 of the regulator (not shown) over lines 113 and 114. The contact 8 of the regulator is connected to a pilot lamp 16 over line or conductor 115.

When the contact member 3 is closed, due to insufficient or normal gaseous discharge in the battery 2, the resistance 9 is short-circuited. However, when the contact member 3 is opened due to an increase in the gaseous discharge of the battery 2, the charging circuit includes both the resistances 9 and 10, it being assumed that relay 15 is de-energized at that moment. The relay 15 interconnected in the discharge circuit 4 is so selected and adjusted as to become energized and therewith to close the contact member 15' thereof with a predetermined fixed intensity of current flowing therethrough, for example, with the current flowing therethrough needed by the vehicle headlights. When the current intensity in the load circuit 4 is sufficient, the resistances 9 and 10 are short-circuited by reason of energization of relay 15 which thereupon closes the contact member 15' thereof whereby the resistances 9 and 10 are permanently short-circuited no matter what the position of the interrupter or contact member 3 as long as the discharge current through the discharge line 4 is sufficient to maintain the relay 15 energized.

When the discharge current in load circuit 4 becomes relatively small, the relay 15 is again de-energized and thereby opens its contact member 15' so that the voltage at the load in the discharge circuit 4 follows a curve analogous to the curve $B_1$–$B_2$–$B_3$–$B_4$–$B_5$–$B_6$ of FIGURE 1. When the discharge current in load circuit 4 becomes more significant, the relay 15 is energized again thereby closing contact member 15' thereof whereby the voltage in the discharge circuit follows a curve analogous to that of the straight line $C_1$–$C_7$. The pilot light 16 enables an observer to follow the operation and movements of the regulator.

Figure 6:
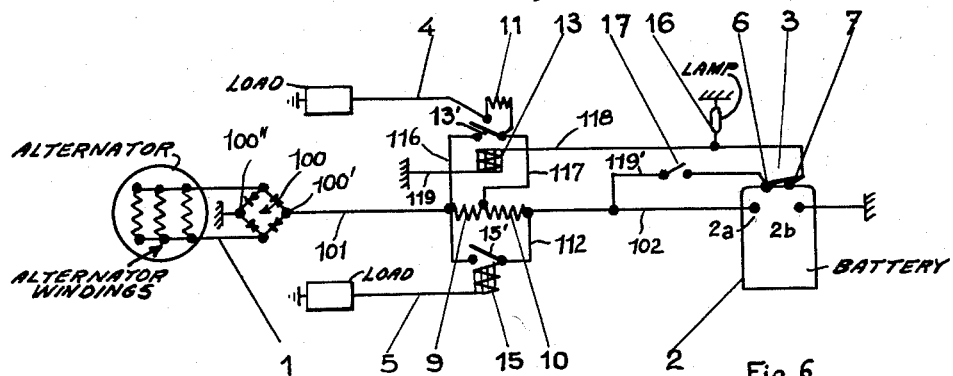

FIGURE 6 illustrates a still further modified embodiment in accordance with the present invention in which the resistances 9 and 10, as well as the relay 15, are arranged in the same fashion and operate in the same manner as in the embodiment according to FIGURE 5. However, the terminals of the resistance 9 are connected over lines or conductors 116 and 117 to the terminals of the contact member 13' of the relay 13 of which the winding is connected on the one side, over line 118, to the terminal 7 of the contact member 3 of the regulator and, on the other, over line 119 to ground. Furthermore, the discharge circuit 4 includes a discharge resistance 11 connected to that terminal of contact member 13' which is connected to the common terminal of the resistances 9 and 10 over line 117, whereby the resistance 11 may be short-circuited by the contact member 13' of relay 13 in the open or de-energized position thereof. The arrangement also includes an interrupter or switch 17 connected over conductor 119' and part of conductor 102 between the terminal 2a of the battery and the terminal 6 of the contact member 3 of the regulator. A pilot lamp 16 is connected over line 118 to the terminal 7 of the contact 3 which plays the same role in this embodiment as in the embodiment according to FIGURE 3. The voltage at the loads in the discharge circuits 4 and 5 follows a curve analogous to that of the curve $B_1$–$B_2$–$B_3$–$B_4$–$B_5$–$B_6$ of FIGURE 1.

Figure 7:
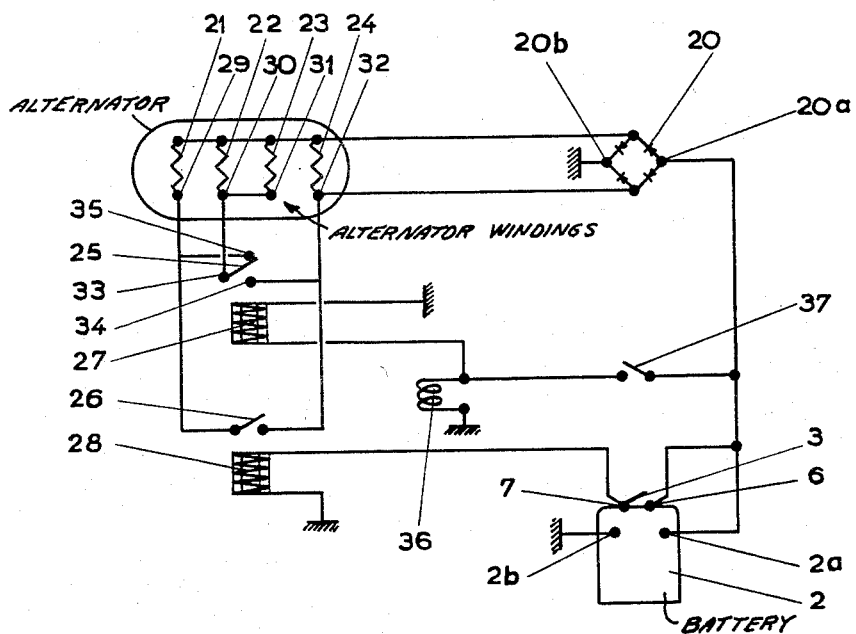

The arrangement illustrated in the embodiment of FIGURE 7 includes a current source comprising an alternator having four windings 21, 22, 23 and 24 which have one terminal in common. The alternator supplies a battery 2 over a rectifier 20. The battery 2 is provided with a regulator controlled by the pressure of the gases discharged by the battery; the regulator actuates a contact member 3 which is closed when the gaseous discharge is normal and which is opened when the gaseous discharge is greater than normal. One terminal 20a of the rectifier 20 is connected to one terminal 2a of the battery. The second terminal 2b of the battery and the second terminal 20b of the rectifier are connected to ground. The winding 24 of the alternator is directly connected with the rectifier 20. In contrast thereto, the windings 21, 22 and 23 are connected to the rectifier 20 by means of contact members 25 and 26 controlled respectively by relays 27 and 28. The free terminal of the winding 21 is connected to the terminal 32 of the winding 24 across a contact member 26 of the relay 28 which is closed when the relay 28 is energized. The terminal 30 of the winding 22 is connected, on the one hand, to the terminal 31 of the winding 23 and, on the other, to the terminal 33 of the contact member 25 of relay 27. When the relay 27 is energized, the contact member 25 is closed across 33–34 and the terminal 30 of the winding 22 is connected to the terminal 32 of the winding 24. If the relay 27 is not energized, the contact 33–34 is open and the contact 33–35 is closed due to the action of a return spring (not illustrated) and the terminal 30 of the winding 22 is thereby connected to the terminal 29 of the winding 21. When the contact 33–34 is established, the windings 22 and 23 are in parallel with the winding 24. On the other hand, when the contact 33–35 is established the windings 22 and 23 are in parallel with the winding 21.

The coil of the relay 28 is connected to a terminal 7 of the regulator in such a manner that when the gaseous pressure controlled regulator closes its contact 3, the relay 28 is energized and thereby closes the contact member 26 thereof.

The winding or coil of the relay 27 is connected in parallel with a load circuit 36 such as the headlights of an automobile. The circuit 36 is connected to the terminals of the battery 2 and is adapted to be opened or interrupted by a switch 37.

Operation

The operation of the embodiment illustrated in FIGURE 7 is as follows:

When the contact member 3 of the regulator is opened and the headlights are turned off, the switch 37 is open, the two relays 27 and 28 are deenergized thereby having their contact members in the position illustrated in FIGURE 7 while the contact 33–35 is established by the contact member 25, and the winding 24 of the alternator is the only winding interconnected in the circuit. The alternator output is thereby at minimum.

When the contact member 3 of the regulator is open and the headlights 36 are turned on, the switch 37 is closed and the relay 27 is energized. Consequently, the contact 33–34 is established by contact member 25, the windings 22, 23 and 24 are connected into the circuit, and the load or output of the alternator is at an intermediate value.

When the contact member 3 of the regulator is closed, the contact member 26 of relay 28 is also closed so that the winding 21 is connected in the circuit as well as the windings 22 and 23 of the alternator, either by the contact 33–34 or by the contact 33–35 and the switch 26, the winding 24 being always connected in the circuit; consequently, all four windings 21 through 24 of the alternator are effective and the output of the alternator is maximum.

It is understood that the principle of the arrangement illustrated in FIGURE 7 may be readily generalized and that other arrangements of the windings may well be used. Similarly, the windings may also be controlled in a different manner, for example, some of the windings may be controlled by a current-responsive device while others by another such device. Thus, for example, the winding 22 could be placed into the circuit at the same time the headlights are turned on and the winding 33 at the same time the heater is turned on.

It is also understood that instead of a relay control arrangement the contact members which are operative to place the various windings into the circuit may be controlled directly, for example, by a mechanical connection between the switch 37 and the contact 33–34–35.

It is further understood that more than four windings may be provided for the alternator which enables further variations of the present invention.

However, in all of these combinations the opening of the regulator which is responsive to the gaseous discharge may control, either directly or by the intermediary of a relay, the insertion of resistances into the discharge circuit.

While I have shown and described several preferred embodiments in accordance with the present invention, it is understood that the present invention is not limited thereto but is susceptible of many changes and modifications within the spirit of the present invention and I, therefore, intend to cover all such changes and modifications as encompassed in the appended claims.

I claim:

1. A regulating system for a battery adapted to control charging thereof and regulate the voltage fluctuations in the load circuit connected across the battery terminals, comprising charging means operatively connected with said battery terminals including alternator means, rectifier means and first selectively operable means for controlling the charging of said battery, discharge circuit means operatively connected with said battery terminals and including second selectively operable means for minimizing the voltage fluctuations appearing in the load connected to said discharge circuit means during operation of said first-mentioned selectively operable means, pressure responsive means responsive to gas pressure developed by said battery, and means operatively connecting said pressure responsive means with said first and second selectively operable means for effectively reducing by said first-mentioned selectively operable means the charging of said battery in the presence of a predetermined gas pressure produced by said battery while effectively rendering said second-mentioned selectively operable means ineffectual to reduce the voltage appearing at the load in said discharge circuit means.

2. A regulating means for controlling the voltage at the terminals of a battery, circuit means operatively connected to said battery including a current generator and a charging circuit for charging the battery and at least one discharge circuit connected to said battery, said discharge circuit including a variable load, said current generator including an alternator in series with a rectifier, said alternator having a plurality of windings, and control means including contact means responsive to gas pressure caused by gaseous discharge of said battery for modifying at least one of the circuits connected to said battery and for maintaining the voltage at the terminals of the discharge circuit approximately at a constant predetermined value, the contact means being arranged to connect at least part of said windings into and out of said charging circuit.

3. A regulating means for effectively controlling the voltage at the terminals of a battery, said battery being connected for charging to a charging circuit including a rectifier fed by means of an alternating current generator and said battery being also connected to a discharge circuit including a variable load, said alternating current generator being provided with several windings, comprising contact means responsive to gas pressure caused by gaseous discharge of the electrolyte of said battery, and means operatively connecting said contact means in said circuit for modifying the connections thereof, said last-mentioned means being operative to maintain the voltage at the terminals of said discharge circuit approximately at a constant predetermined value, and said contact means effectively connecting and disconnecting a resistance means in said discharge circuit and effectively connecting and disconnecting part of said generator windings into and out of said charging circuit.

4. A regulating means according to claim 3, further comprising relay means operatively connected with said contact means for producing the circuit connections and disconnections in the discharge and charging circuits.

5. A regulator arrangement for the charging and discharging of a battery, intended to limit the fluctuations of voltage in the electrical loads fed by said battery, comprising pressure-responsive regulator means, means controlling said regulator means by the gaseous discharge of said battery, charging circuit means operatively connected with said battery and provided with voltage-adjusting means for varying the charging voltage, discharge circuit means operatively connected to said battery, resistance means interconnected in at least one of said circuit means, and means controlled by said regulator means and operatively connected with said resistance means and with said voltage adjusting means for selectively placing said resistance means into and out of at least the discharge circuit means and for simultaneously controlling the voltage adjusting means in dependence on said gaseous discharge to thereby effectively minimize fluctuations in the load voltage.

6. A regulator arrangement according to chain 5, wherein said battery has at least one terminal, wherein said pressure responsive regulator means has two contact terminals and a contact member, and wherein one of said resistance means is interconnected in said charging circuit means and another one of said resistance means is interconnected in said discharge circuit means, said resistance means being both connected to one of said terminals of said regulator means, and one terminal of said regulator means being connected to said one terminal of the battery, said regulator means being operative to alternately place said resistance means into and out of said circuit means.

7. A regulator arrangement according to claim 5, wherein said pressure responsive regulator means has two contact terminals and a contact member, and further comprising relay means controlled by said regulator means and connected to one of the two contact terminals of said regulator means, said relay means including contact means for placing into or out of the respective circuit means said resistance means.

8. A regulator arrangement according to claim 5, wherein each of said circuit means includes one of said resistance means, and wherein said controlled means is operative to effectively connect the resistance means of said charging circuit means into the charging circuit when the gaseous discharge from said battery exceeds a predetermined amount, while said last-mentioned resistance means is normally short-circuited during normal gaseous discharge from said battery.

9. A regulator arrangement according to claim 5, which includes a plurality of discharge circuit means, and wherein one of said resistance means is interconnected in said charging circuit means and includes two end terminals and one intermediate terminal, a first relay interconnected in one of said discharge circuit means and including a contact member connected across said end terminals, a second relay connected to one of said two terminals of said regulator means and including a contact member connected across one of said end terminals and said intermediate terminal of said last-mentioned resistance means, another resistance means being connected in another discharge circuit means, said second contact member being connected to said second-mentioned resistance means and being adapted to short-circuit the same.

10. A regulator arrangement according to claim 9, wherein said battery has at least one terminal, and further comprising a circuit including a switch connecting one of said two terminals of said regulator means with said one terminal of said battery.

11. A regulating system for effectively controlling the voltage at the terminals of a battery and across a load connected to said battery, comprising battery charging means including a charging circuit operatively connecting said battery with the charging means for charging the same, a discharge circuit operatively connecting said battery with the load, said charging means and said discharge circuit each being provided with regulating means for regulating the voltage applied from the charging means to said battery by way of said charging circuit and for regulating the voltage appearing across the load by way of said discharge circuit, pressure-controlled regulating means including contact means responsive to gas pressure caused by gaseous discharge of the electrolyte of said battery, and connecting means operatively connecting said contact means with both of said regulating means for modifying the connections of said charging and discharge circuits to maintain the voltage at the terminals of said discharge circuit approximately at a constant predetermined value while simultaneously therewith regulating the voltage applied across said battery terminals by way of said charging circuit in dependence on the gas pressure caused by gaseous discharge of the battery electrolyte, said connecting means being operable together with said regulating means, on the one hand, to effectively decrease the charging voltage across said battery terminals in the presence of a predetermined gaseous battery discharge and at the same time to increase the proportion of battery terminal voltage applied across the discharge circuit terminals and, on the other, to increase the charging voltage across said battery terminals in the presence of gaseous battery discharge below said predetermined level and at the same time to decrease the proportion of battery terminal voltage applied across the discharge circuit terminals.

12. A regulating system for effectively controlling the voltage at the terminals of a battery and across a load connected to said battery, comprising battery charging means including an alternating current generator and a charging circuit provided with a rectifier and operatively connecting said battery with the generator of said charging means for charging the same, a discharge circuit operatively connecting said battery with the load, said charging means and said discharge circuit each being provided with regulating means for regulating the voltage applied from the alternating current generator of said charging means to said battery by way of said charging circuit and for regulating the voltage appearing across the load by way of said discharge circuit, pressure-controlled regulating means including contact means responsive to gas pressure caused by gaseous discharge of the electrolyte of said battery, and connecting means operatively connecting said contact means with both of said regulating means for modifying the connections of said charging and discharge circuits to maintain the voltage at the terminals of said discharge circuit approximately at a constant predetermined value while simultanously therewith regulating the voltage applied across said battery terminals by way of said charging circuit in dependence on the gas pressure caused by gaseous discharge of the battery electrolyte, said connecting means being operable together with said regulating means, on the one hand, to effectively decrease the charging voltage across said battery terminals in the presence of a predetermined gaseous battery discharge and at the same time to increase the proportion of battery terminal voltage applied across the discharge circuit terminals and, on the other, to increase the charging voltage across said battery terminals in the presence of gaseous battery discharge below said predetermined level and at the same time to decrease the proportion of battery terminal voltage applied across the discharge circuit terminals.

13. A regulator arrangement for the charging and discharging of a battery, intended to limit the fluctuations of voltage in the electrical loads fed by said battery, comprising pressure responsive regulator means, means controlling said regulator means by the gaseous discharge of said battery, charging circuit means provided with voltage-adjusting means for changing the charging voltage and discharge circuit means connected to said battery, resistance means interconnected in at least one of said circuit means, means controlled by said regulator means and operatively connected with said resistance means and said voltage-adjusting means for selectively placing said resistance means into and out of at least the discharge circuit means and for simultaneously controlling the voltage adjusting means in dependence on said gaseous discharge to thereby effectively minimize fluctuations in the load voltage, alternating current generator means including windings for supplying charging current to said battery and including a contact member adapted to interconnect respective terminals of said windings, and means forming part of said voltage adjusting means operatively connecting said contact member with said means controlled by said regulator means for effectively placing a part of said windings into or out of the charging circuit means.

14. A regulating means for effectively controlling the voltage at the terminals of a battery and across a load connected to said battery, comprising a charging circuit operatively connected with said battery for charging the same including an alternating current generator and a rectifier fed by said alternating current generator, a discharge circuit operatively connecting said battery with said load, said charging circuit and said discharge circuit being provided with regulating means for regulating the voltage applied from said alternating current generator to said battery by way of said charging circuit and for regulating the voltage appearing across the load by way of said discharge circuit, contact means responsive to gas pressure caused by gaseous discharge of the electrolyte of said battery, and means operatively connecting said contact means with said regulating means for modifying the connections of said circuits to maintain the voltage at the terminals of said discharge circuit approximately at a constant predetermined value while simultaneously therewith regulating the voltage applied across said battery by way of said charging circuit in dependence on the gas pressure caused by gaseous discharge of the battery electrolye, said alternating current generator being provided with several windings, the impedance of said charging circuit being effectively adjusted according to the gas pressure developing in the battery by the contact means connecting and disconnecting at least one windings of the alternating current generator by means of which the voltage at the load is maintained approximately constant.

15. A regulating means for controlling the voltage at the terminals of a battery, circuit means operatively connected to said battery including a current generator and a charging circuit for charging the battery and at least one discharge circuit connected to said battery, voltage regulating means operatively connected with one of said current generator and said charging circuit for effectively adjusting the voltage applied from said current generator to said battery by way of said charging circuit, said discharge circuit being adapted to be connected with a load and including further voltage regulating means operatively connected with said discharge circuit for regulating the voltage applied across said load, contact means responsive to gas pressure caused by gaseous discharge of said battery, and control means operatively connecting said contact means with said first and second-mentioned regulating means for modifying in dependence on the gaseous discharge of said battery, the voltage applied to said battery by way of said charging circuit and to minimize fluctuations of the voltage appearing at the load, said generator being an alternator having several windings, a rectifier connected in said charging circuit between said alternator and said battery, and said regulating means including a relay having a coil connected to said contact means, a relay having a coil connected to said dischcarge circuit, the relays comprising contacts connected to the windings of the alternator for placing part of said windings into and out of the charging circuit.

References Cited in the file of this patent

UNITED STATES PATENTS

| | | |
|---|---|---|
| 1,605,020 | Woodbridge | Nov. 2, 1926 |
| 1,745,519 | Von Ohlsen | Feb. 4, 1930 |
| 2,104,632 | Agnew | Jan. 4, 1938 |
| 2,204,101 | Fumagalli | June 11, 1940 |
| 2,239,510 | Vigren | Apr. 22, 1941 |
| 2,337,494 | Rady | Dec. 21, 1943 |

FOREIGN PATENTS

| | | |
|---|---|---|
| 238,045 | Great Britain | Aug. 13, 1925 |